US006201867B1

(12) United States Patent
Koike

(10) Patent No.: US 6,201,867 B1
(45) Date of Patent: *Mar. 13, 2001

(54) PORTABLE TELEPHONE HAVING A REMOVABLE COVERING

(76) Inventor: Kunihiko Koike, 28-1, Wakabayashi 2-chome, Setagaya-ku, Tokyo 154 (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,961

(22) Filed: Dec. 19, 1997

(30) Foreign Application Priority Data

May 14, 1997 (JP) .................................................. 9-123874

(51) Int. Cl.⁷ ............................................. H04M 1/00
(52) U.S. Cl. ............................................. 379/433; 379/452
(58) Field of Search ...................... 379/433, 428, 379/447, 455, 426, 454, 452, 439, 437, 445; 224/930; 40/546; 349/65; 455/90, 575

(56) References Cited

U.S. PATENT DOCUMENTS

| | | | |
|---|---|---|---|
| 4,862,613 | * 9/1989 | Eyngorn | 40/546 |
| 4,901,852 | * 2/1990 | King | 224/930 |
| 5,475,752 | * 12/1995 | Mishenko | 379/433 |
| 5,699,425 | * 12/1997 | Chambers | 379/437 |
| 5,896,453 | * 4/1999 | Speaks | 379/433 |
| 5,963,280 | * 10/1999 | Okuda et al. | 349/65 |

FOREIGN PATENT DOCUMENTS

| | | | |
|---|---|---|---|
| 6-268548 | * 9/1994 | (JP) | 379/428 |
| 07297894 | 11/1995 | (JP) . | |
| 08018637 | 1/1996 | (JP) . | |
| 08125728 | 5/1996 | (JP) . | |
| 3035199 | 12/1996 | (JP) . | |
| 10190794 | 7/1998 | (JP) . | |

* cited by examiner

Primary Examiner—Jack Chiang
(74) Attorney, Agent, or Firm—Dickstein Shapiro Morin & Oshinsky, LLP

(57) ABSTRACT

A portable telephone comprises a portable telephone body, and a body cover for covering the portable telephone body. The body cover is formed of a transparent acrylic resin and has the back side with various colors applied to, whereby the portable telephone can be used corresponding to scenes where the portable telephone is used. The body cover includes a battery cover unit which is independently removable, whereby it is not necessary to disassemble the entire body cover for battery replacement.

13 Claims, 4 Drawing Sheets

PORTABLE TELEPHONE HAVING A REMOVABLE COVERING

BACKGROUND OF THE INVENTION

The present invention relates to a portable telephone, such as general portable telephone, PHS telephone or others, more specifically to a display device which is fashionable enough to meet young generation's tastes.

Recently prevalence of portable telephones including PHS has explosively increased as prices of the portable telephones and telephone services become inexpensive, and the generation of their users tend to shift from workers who have been users of the conventional portable telephones to students who belong to the young generation. In accordance with this tendency, portable telephones of various designs have been marketed by the portable telephone makers to meet a wide variety of young people's tastes.

As designs of the portable telephones become thus various, it is expected that one person will want to own a plurality of portable telephones of different designs to change the portable telephones in accordance with various scenes.

For one person to own a plurality of portable telephones, a purchasing money and a basic service fee are necessary for each portable telephone, and the costs are unrealistically too high to satisfy the above-described desire. In consideration of the almost saturated state of the telephone lines, it is not preferable for one person occupy a plurality of telephone lines.

In view of such actual state the present invention has been made, and an object of the present invention is to provide a portable telephone which can meet a wide variety of tastes of the young generation and can have a different design in accordance with a scene where it is used.

SUMMARY OF THE INVENTION

The above-described object is achieved by a portable telephone comprising a portable telephone body, and a body cover for covering the portable telephone body. A plurality of the body covers of different designs are owned, and the body covers alone are changed to thereby select, without changing the portable telephone body, the body cover of that of the designs suitable to a scene where the portable telephone is used. The portable telephone is covered with the body cover, and the body cover is useful to protect the portable telephone body.

In the above-described portable telephone, it is preferable that the body cover comprises: a receiving unit cover for covering a receiving unit of the portable telephone body; and a battery cover being removable from the receiving unit cover, for covering a battery unit of the portable telephone body. When the battery has run out, the battery unit cover alone is removed from the receiving unit cover to replace the battery by a new one. The work of disassembling the entire body cover for only replacing the battery is unnecessary.

In the above-described portable telephone, it is preferable that the receiving unit cover has at least one opening formed in for exposing an operational button, a display, an antenna, and a receiving mouth or a transmitting mouth. For example, the opening is formed in alignment with the operational button, whereby the operational button can be operated directly through the opening. The opening is formed in alignment with the display unit, whereby display information can be more clearly provided to the user, and a step defined by the opening can protect the display unit from external forces. When the opening is formed in alignment with the antenna, the antenna can be projected outside through the body cover, whereby higher sensitivity is available. When the opening is formed in alignment with the receiving mouth or the transmitting mouth, voices can be more clearly received and transmitted.

In the above-described portable telephone, it is preferable that the receiving unit cover includes a button member interlocked with the operational button of the receiving unit. The button operation is ensured even with the portable telephone body covered with the body cover.

In the above-described portable telephone, it is preferable that the body cover is transparent or semitransparent. For example, various information displayed in the liquid crystal display or others of the portable telephone body can be seen through the body cover.

In the above-described portable telephone, it is preferable that a paint is applied to a back side of the body cover. The portable telephone can readily have an original design of a color corresponding to a user's taste. By using a fluorescent paint or a light storing paint as the paint the portable telephone can emit light in dark places, such as dark rooms, movie theaters, etc., whereby the portable telephone amusingly gives visual impacts.

DETAILED DESCRIPTION OF INVENTION

Figure 1:
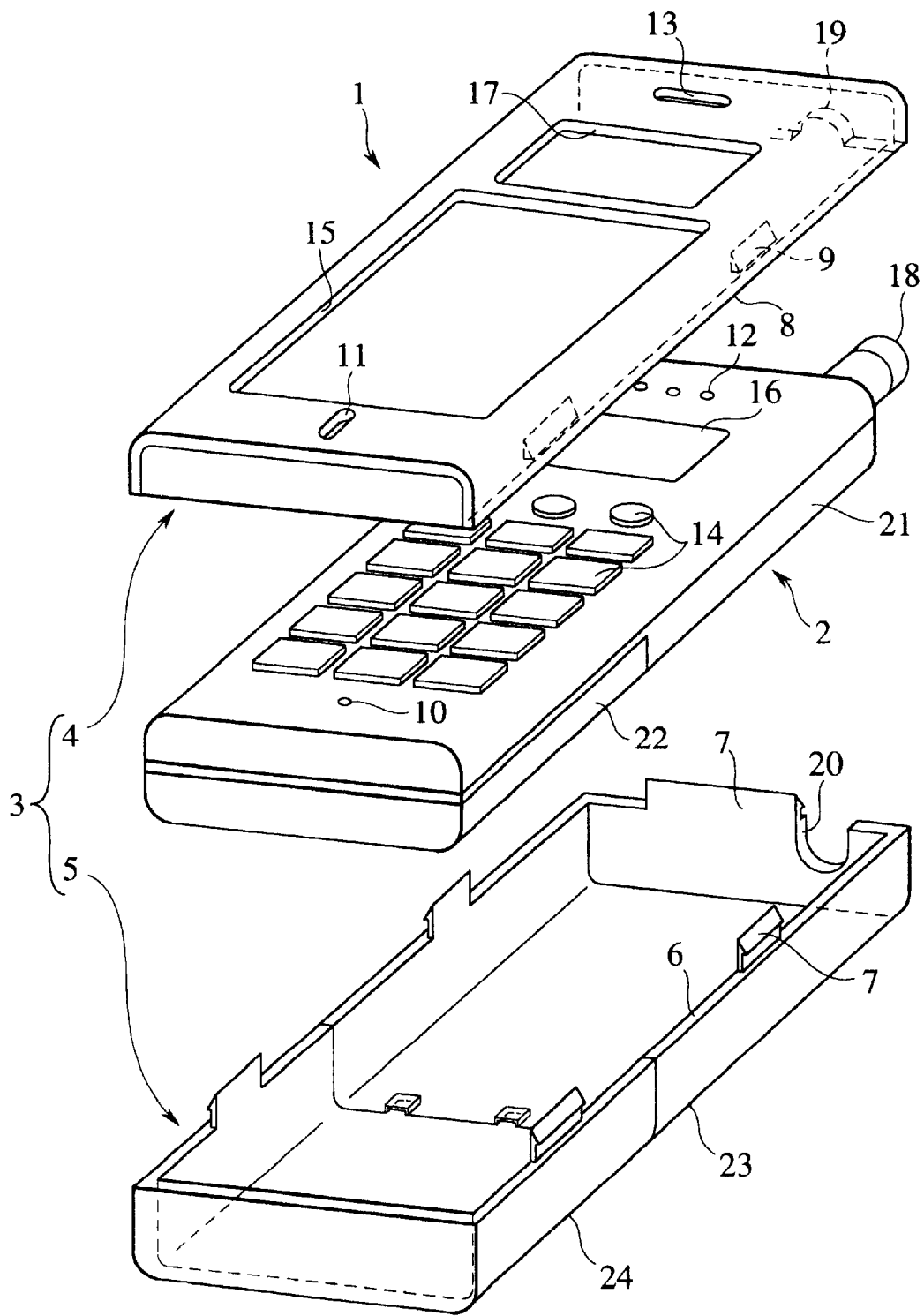
FIG. 1 is a broken perspective view of the portable telephone according to an embodiment of the present invention.
Figure 2:
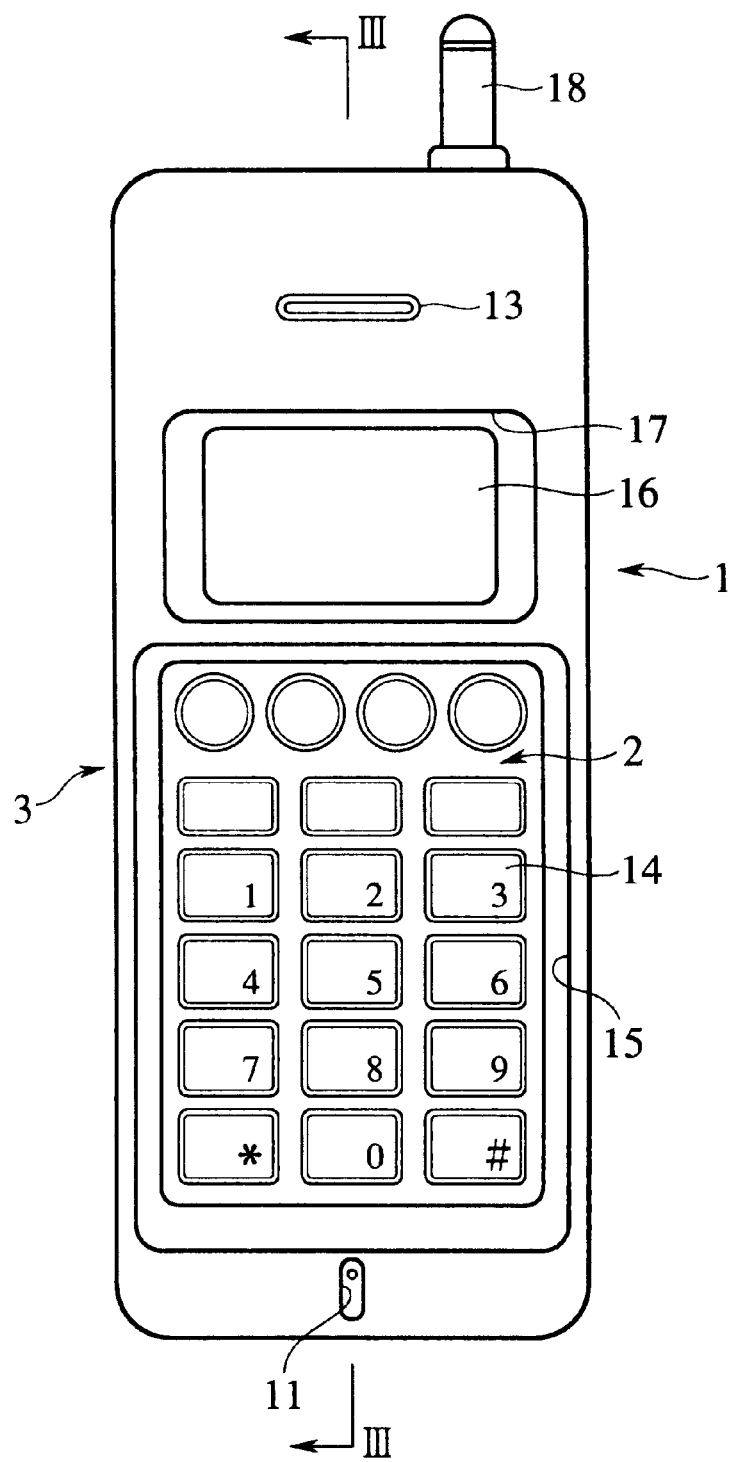
FIG. 2 is a plan view of the portable telephone shown in FIG. 1.
Figure 3:
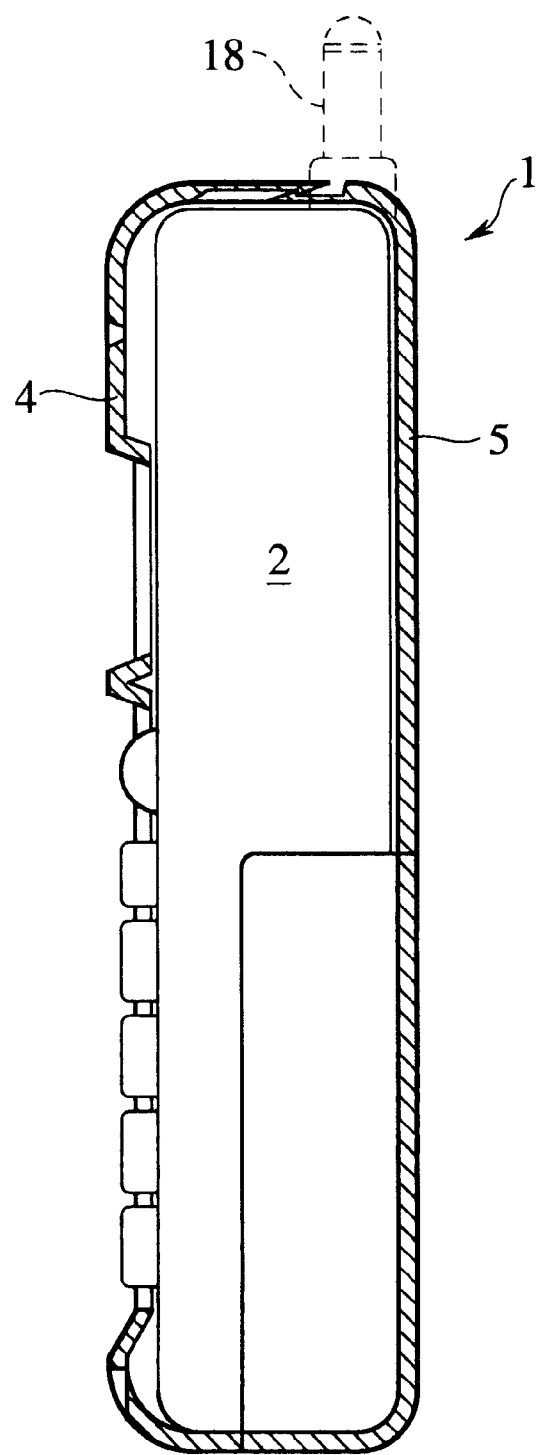
FIG. 3 is a sectional view of the portable telephone of FIG. 2 along the line III—III.

The portable telephone according to an embodiment of the present invention will be explained with reference to FIGS. 1 to 3. FIG. 1 is a broken perspective view of the portable telephone according to the embodiment of the present invention. FIG. 2 is a plan view of the portable telephone according to the present embodiment. FIG. 3 is a sectional view of the portable telephone according to the present embodiment along the line III—III in FIG. 2.

The portable telephone 1 according to the present embodiment has a portable telephone body 2 entirely covered with a body cover 3. The body cover 3 is formed of, e.g., a transparent plastic material, such as acrylic resin or others and is constituted by an upper body cover 4 for covering an upper portion of the portable telephone body 2, and a lower body cover 5 for covering a lower portion of the portable telephone body 2. The upper body cover 4 and the lower body cover 5 are integrated with each other by engaging snap members 7 projected from a margin 6 (peripheral edge portion) of the lower body cover 5 with recesses 9 provided in a margin 8 of the upper body cover 4.

In the upper body cover 4 there are formed a transmitting holes 11 and a receiving holes 13 respectively opposed to a transmitting mouth 10 and a receiving mouth 12 formed in the portable telephone body 2 for receiving and transmitting clear voices. A button opening 15 through which various operational buttons 14 of the portable telephone body 2 are exposed, and a display opening 17 through which a liquid crystal display 16 is exposed are formed also in the upper body cover 4. A user can directly operate the operational buttons through the button opening 15 and can directly see displayed information through the display opening 17. The display opening 17 defines a step between the upper surface of the body cover 3 and the liquid crystal display 16, and the step has the effect of protecting the liquid crystal display 16 from external forces.

In the upper side of the upper body cover 4 there is formed an antenna groove 19 through which an antenna 18 is projected from the portable telephone body 2. The antenna groove 19 is matched with an antenna groove 20 formed in the lower body cover 5 to define a hole through which the antenna 18 is projected outside through the body cover 3 for maintaining sensitivity of the portable telephone.

The portable telephone body 2 includes a receiving unit 21 incorporating a transmitting/receiving circuits, a liquid crystal circuit, etc., and a battery unit 22 which is removable from the receiving unit 21 and is an electric power source of the portable telephone body 2. The above-described various operational buttons 14, the liquid crystal display 16, etc. are disposed in the receiving unit 21.

On the other hand, the lower body cover 5 for covering the lower portion, as viewed in FIG. 1, of the portable telephone body 2 is divided in a receiving unit cover 23 for covering a lower half of the receiving unit 21, and in a battery unit cover 24 for covering the battery unit 22, which is removable from the receiving unit cover 23. When the battery has run out, for example, the user removes only the battery unit cover 24 from the receiving unit cover 23 to replace the battery with a new one. The work of disassembling the entire body cover for the battery displacement can be eliminated.

As described above, the portable telephone according to the present embodiment has the structure of covering a commonly marketed portable telephone body with the body cover, whereby the portable telephone body can be protected by the body cover, and a user owns not only the body cover which is transparent, but also the body covers in various colors, e.g., red, white, camouflage color, etc., and can replace the body covers corresponding to scenes and fashions.

In a case that the body cover 3 is transparent as in the present embodiment, a user applies a commonly-used water-soluble or an oil color paint to the back side of the body cover 3 to make the body cover original to him(her).

The paint to the applied to the back side of the body cover 3 may be, in addition to the commonly-used paints, light storing paints, fluorescent paints, or others. In this case, the portable telephone 1 emits light at night and dark places, e.g., black chambers, movie theaters, etc., which facilitates a user finding the portable telephone 1. At discos, clubs, etc. the light emission makes the portable telephone cybertic, which gives visual impact and makes the portable telephone amusing.

The paint may be a special paint which emits a different color responsive to a specific light, e.g., black light in discos. In this case, the portable telephone which is usually white changes the color to blue under black light, which makes the portable telephone unique.

Figure 4:
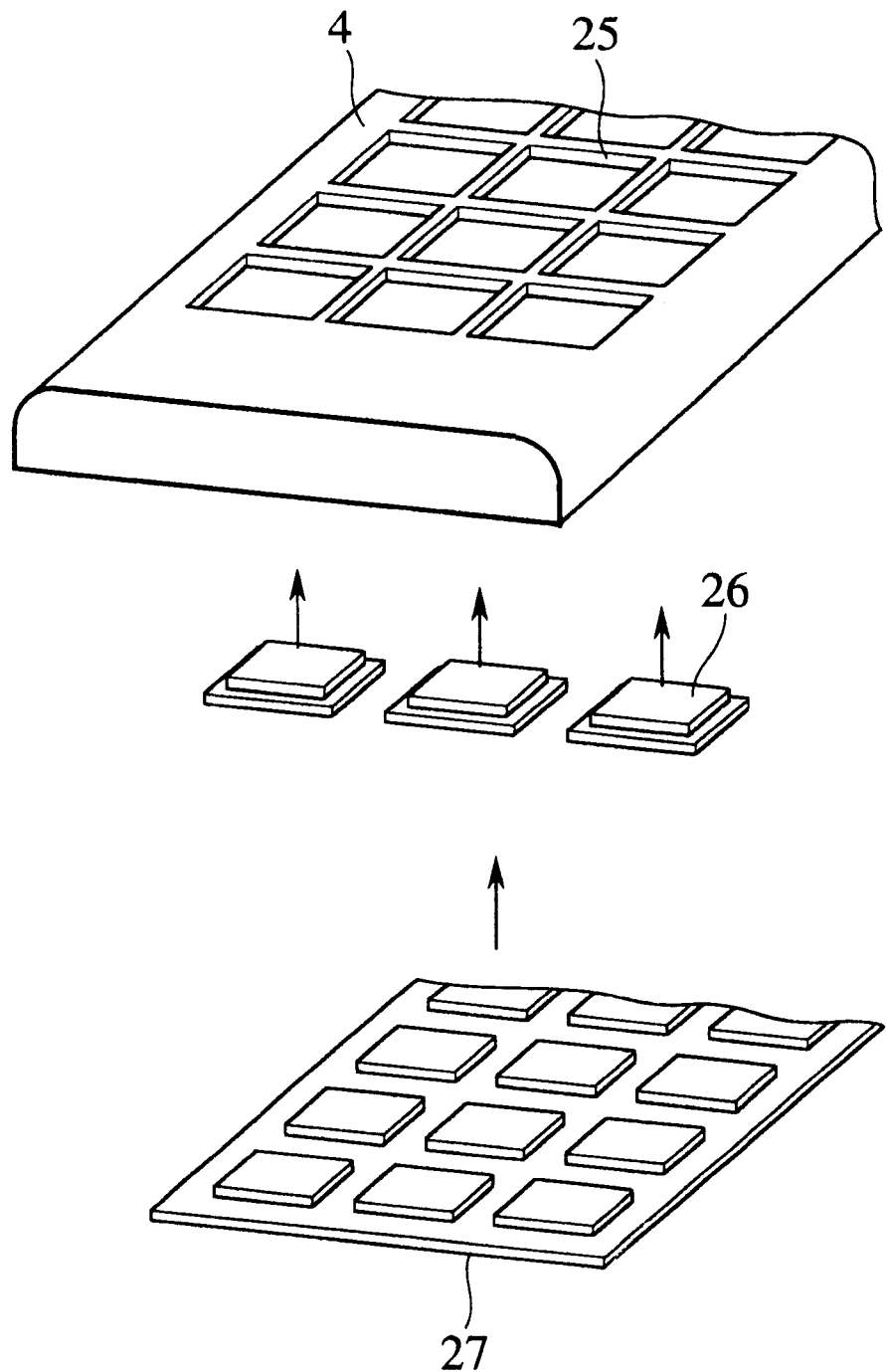
FIG. 4 is a perspective view of an appearance of an upper body cover and button members of the portable telephone according to another embodiment of the present invention.

The portable telephone according to another embodiment of the present invention will be explained with reference to FIG. 4.

In the embodiment shown in FIGS. 1 to 3, the operation button opening 15 is formed in a part of the upper body cover 4 corresponding to the operational buttons 14 of the portable telephone 2, but in the present embodiment, a plurality of operational button openings 25 associated with respective operational buttons 14 are formed in the upper body cover 4, and button members 26 which respectively are operatively interlocked with the operational buttons 14. This arrangement has a merit that even when the operational buttons 14 are little projected, the operational buttons 14 can be operated without failure.

The button members 26 may be replaced by an integrated button member 27, as shown below in FIG. 4, (like a key board cover) of a flexible material, such as propylene or others. In this case, the flexibility of the integrated button member 27 makes the button operation feel better.

The present invention is not limited to the above-described embodiments and can cover other variations and modifications.

For example, in the above-described embodiment, the body cover has a bisected structure in which the body cover is divided in the direction of thickness of the portable telephone, but this structure is not essential, and a bisected structure in which the body cover is divided in the direction of length of the portable telephone.

In the above-described embodiments, the display opening 17 is formed in alignment with the liquid crystal display 16 of the portable telephone body 2, but in a case that the body cover is transparent, the display opening may not be formed because of the transparency. In a case that the body cover is not transparent, a transparent plastic plate is mounted on the part in place of forming the opening.

Electromagnetic waves from portable telephones are feared. As a countermeasure to this, the body cover is formed of an electromagnetic wave shield material, or a marketed electromagnetic wave shield seal may be adhered to the back side of the body cover, whereby electromagnetic wave emission from the portable telephone to users is reduced.

What is claimed is:

1. A portable telephone comprising:
a portable telephone body; and
a changeable body cover for covering the portable telephone body, said changeable body cover comprising:
an upper body cover for covering an upper portion of the portable telephone body and a lower body cover for covering a lower portion of the portable telephone body, the upper body cover and the lower body cover being engaged with each other to form the changeable body cover,
said upper body cover comprising a first opening formed in for exposing an operational button of a receiving unit of the portable telephone body, and a second opening formed in for exposing a display of the receiving unit of the portable telephone body,
said lower body cover comprising a receiving unit cover for covering the receiving unit of the portable telephone body and a battery cover being removable from the receiving unit cover, for covering a cover of a battery unit of the portable telephone body.

2. A portable telephone according to claim 1, wherein the receiving unit cover has at least one opening formed in for exposing an operational button, a display, an antenna, a receiving mouth or a transmitting mouth of the receiving unit.

3. A portable telephone according to claim 1, wherein the changeable body cover includes a button member interlocked with the operational button of the receiving unit.

4. A portable telephone according to claim 1, wherein the changeable body cover is transparent or semitransparent.

5. A portable telephone according to claim 1, wherein a paint is applied to a back side of the changeable body cover.

6. A portable telephone body according to claim 5, wherein the paint is a fluorescent paint or a light storing paint.

7. A portable telephone cover according to claim 1, wherein said changeable body cover is formed of a hard plastic material.

8. A portable telephone body according to claim 7, wherein said hard plastic material is an acrylic resin.

9. A changeable body cover for covering a portable telephone body, said changeable body cover comprising:

an upper body cover for covering an upper portion of the portable telephone body and a lower body cover for covering a lower portion of the portable telephone body, the upper body cover and the lower body cover being engaged with each other to form the changeable body cover, said lower body cover comprising a receiving unit cover for covering a receiving unit of the portable telephone body; and a battery cover for covering a battery unit cover of the portable telephone body, said battery cover being removable from the receiving unit cover.

10. A portable telephone body of a portable telephone, said portable telephone body being covered with a changeable body cover, said changeable body cover having an upper body cover for covering an upper portion of the portable telephone body and a lower body cover for covering a lower portion of the portable telephone body, the upper body cover and the lower body cover being engaged with each other to form the changeable body cover, the lower body cover including a receiving unit cover for covering a receiving unit of the portable telephone body, and a battery cover for covering a battery unit cover of the portable telephone body, said battery cover being removable from the receiving unit cover.

11. A portable telephone body of a portable telephone according to claim 10, wherein the upper body cover has an opening formed in for exposing a portion of a receiving unit of the portable telephone body.

12. The portable telephone body according to claim 11, wherein said portion of said receiving unit includes an operational button of said receiving unit.

13. The portable telephone body according to claim 11, wherein said portion of said receiving unit includes a display of said receiving unit.

* * * * *